(12) United States Patent
Wolrich et al.

(10) Patent No.: US 6,584,522 B1
(45) Date of Patent: Jun. 24, 2003

(54) COMMUNICATION BETWEEN PROCESSORS

(75) Inventors: Gilbert Wolrich, Framingham, MA (US); Debra Bernstein, Sudbury, MA (US); Matthew J. Adiletta, Worc., MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/475,609

(22) Filed: Dec. 30, 1999

(51) Int. Cl.[7] .............................................. G06F 13/00
(52) U.S. Cl. ........................ 710/100; 710/107; 709/230
(58) Field of Search ................................ 710/100, 107; 709/230

(56) References Cited

U.S. PATENT DOCUMENTS

| | | | | |
|---|---|---|---|---|
| 4,523,272 A | * | 6/1985 | Fukunaga et al. .......... 710/107 |
| 4,866,664 A | * | 9/1989 | Burkhardt et al. .......... 709/227 |
| 5,467,452 A | * | 11/1995 | Blum et al. ..................... 700/2 |
| 5,568,617 A | * | 10/1996 | Kametani ....................... 700/3 |
| 5,781,774 A | * | 7/1998 | Krick .............................. 713/1 |
| 5,828,863 A | * | 10/1998 | Barrett et al. ................. 703/24 |
| 5,832,215 A | * | 11/1998 | Kato et al. ................... 709/230 |
| 5,860,158 A | * | 1/1999 | Pai et al. ..................... 711/118 |
| 5,958,031 A | * | 9/1999 | Kim ............................ 710/107 |
| 5,961,628 A | * | 10/1999 | Nguyen et al. ................. 712/2 |
| 6,112,016 A | * | 8/2000 | MacWilliams et al. ..... 709/232 |
| 6,223,238 B1 | * | 4/2001 | Meyer et al. ............... 710/107 |

* cited by examiner

Primary Examiner—Xuan M. Thai
(74) Attorney, Agent, or Firm—Fish & Richardson P.C.

(57) ABSTRACT

A method of communicating between a first and a second processor includes the first processor sending a datum over a common control bus, and the second processor receiving the datum from the common control bus.

38 Claims, 7 Drawing Sheets

COMMUNICATION BETWEEN PROCESSORS

BACKGROUND

The invention relates to communication between processors.

Multi-processor computer systems have more than one processor. Each processor executes a separate stream ("thread") of instructions. It is sometimes necessary for two processors of a computer system to communicate data between themselves.

SUMMARY

In one general aspect of the invention, method of communicating between a first and a second processor includes the first processor sending a datum over a common control bus, and the second processor receiving the datum from the common control bus.

Advantages and other features of the invention will become apparent from the following description and from the claims.

DETAILED DESCRIPTION

Figure 1:
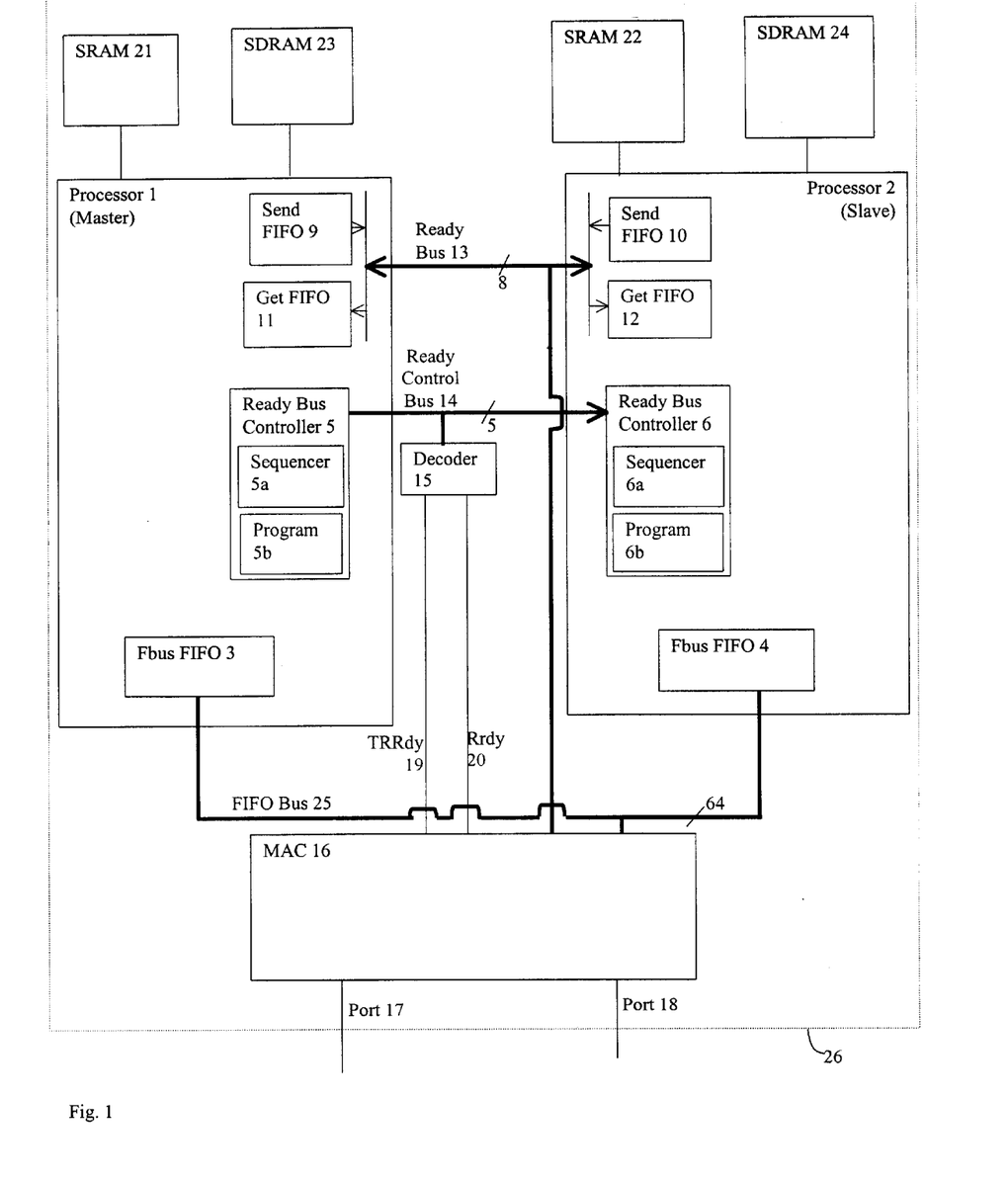
FIG. 1 shows a computer system that has a first and a second processor.

Referring to FIG. 1, a computer system 26 includes two processors 1, 2. Each processor 1, 2 has a corresponding static random access memory (SRAM) 21, 22 for storing data that needs to be accessed with a low latency and a corresponding synchronous dynamic random access memory (SDRAM) 23, 24 for processing large volumes of data.

The processors 1,2 each have an Fbus FIFO 3, 4, which is connected to a 64-bit FIFO bus 25, for communicating to peripheral devices, such as media access controller (MAC) 16. MAC 16 may be a Gigabit Ethernet device that complies with the IEEE 802.3z standard. MAC 16 has two data ports 17, 18. Multiple peripheral devices may be concurrently connected to the FIFO bus 25. Through the FIFO bus 25, each of the processors 1, 2 can communicate with any peripherals 16 connected to the FIFO bus.

At any time, one processor ("the master") controls the FIFO bus 25 using signals sent over the Ready Control Bus 14, while the other processor ("the slave") responds to instructions from the master. In FIG. 1, processor 1 is the master while processor 2 is the slave.

The master controls communications on the first-in-first-out-buffer (FIFO) bus using signals sent on a 5-bit Ready Control Bus 14. The signals allow the master to directly address a device or a slave processor on the bus and to send a query to determine whether the device is ready to transmit (TRRdy) or receive (RRdy) data on the bus. The computer system may include a decoder 15 for decoding signals from the Ready Control Bus into a single TRRdy signal 19 and a single Rrdy signal 20 for a device 16 on the bus.

Additionally, the computer system includes an 8-bit Ready Bus 13, which is used by the master processor 1 to control data flow on the devices on the FIFO bus 25. For example, master processor 1 may use the Ready Bus 13 to direct MAC 16 to send data from port 1 instead of sending data from port 2 onto the bus. Each processor 1, 2 has a send FIFO 9, 10 for buffering data elements that are to be sent on the Ready Bus 13, and a get FIFO 11, 12 for buffering data elements that are received from the Ready Bus 13. Each FIFO 9–12 is capable of storing a number of data elements, and each data element may be a byte, a word, a long word, or a quad word. In the example of FIG. 1, the FIFOs 9–12 are configured to store up to eight long words, each of which has 32 bits. Because each data element is 32 bits, it takes four data transfers on the ready bus to transmit a data element from one processor to other. Other implementations with different bus width and data element sizes may take a different number of transfers to transmit a data element.

Each processor 1, 2 has a Ready Bus controller 5, 6 for controlling the Ready Control Bus 14, the Ready Bus 13 and the FIFO bus 25. The Ready Bus controller 5, 6 may be a microcode program, logic, or a processing unit within the processor. In the embodiment of FIG. 1, the Ready Bus Controller 5, 6 includes a sequencer 5a, 6a for executing a sequence of bus control instructions. The bus control instructions are part of a program 5b, 6b.

Figure 2A:
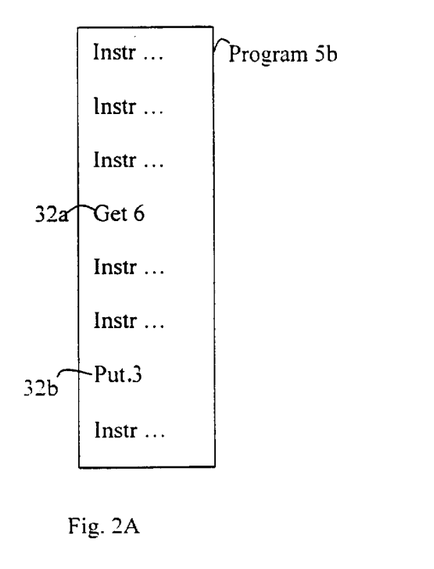
FIG. 2A shows a program executed by the first processor of FIG. 1 that includes a GET instruction and a PUT instruction.

The system 26 provides a way of communicating between processors 1, and 2 over the Ready Bus 13, when the Ready Bus is not being used to communicate data to peripheral devices. Referring to FIG. 2A, processor 1 executes a sequence of instructions contained within program 5b. The instructions include a "GET 6" instruction 32a, which directs the processor 1 to retrieve six data elements from processor 2 and a "PUT 3" instruction, which directs processor 1 to send three data elements to processor 2.

Figure 2B:
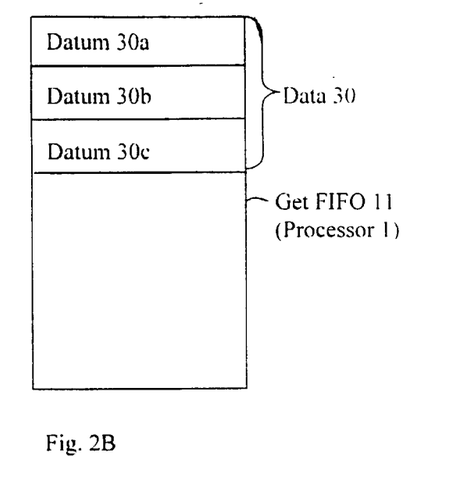
FIG. 2B shows a get FIFO of the first processor of FIG. 1.
Figure 2C:
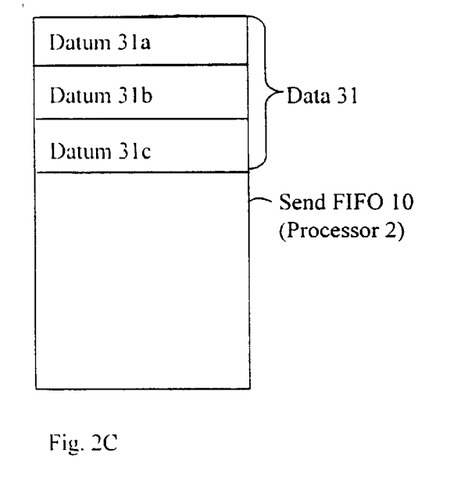
FIG. 2C shows a send FIFO of the second processor of FIG. 1.

Referring to FIG. 2B and 2C, the state, of the get FIFO 11 of processor 1 and the send FIFO 10 of processor 2 prior to the execution of the GET instruction 32a (FIG. 2A) will be described. As shown, get FIFO 11 contains three data elements 30a–c that were previously retrieved from processor 2. However, the number of data elements is less than the six data elements required by the GET instruction 32a. Send FIFO 10 of processor 2 contains 3 data elements 31a–c that are to be sent to processor 1. The data 31 in the send FIFO 10 is transferred to the get FIFO 11 by the GET instruction 32a as described below.

Figure 3:
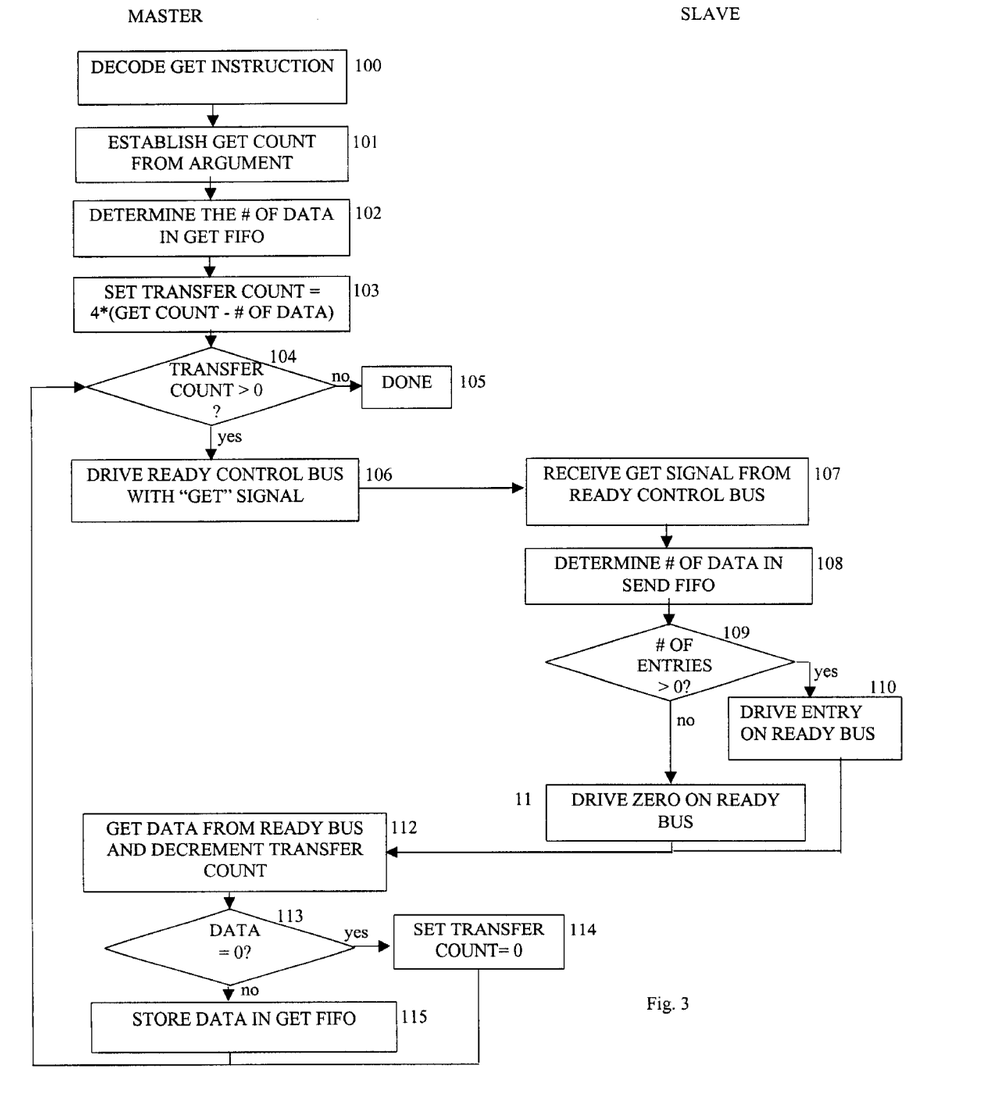
FIG. 3 is a flow chart of the execution of the GET instruction of FIG. 2A.

Referring to FIG. 3, communication of data from a slave processor 2 to the master processor 1 over the Ready Bus 13 will be described. Upon decoding 100 a GET instruction, such as instruction 32a of FIG. 2A, processor 1 determines 101 the number of data elements to be retrieved based on an argument to the GET instruction. For instruction 32a, the number of items to be retrieved is six. The processor 1 determines 102 the number of data elements that are already in its get FIFO 11. The number of data elements in the get FIFO 11 of FIG. 2B is three. The processor 1 sets 103 the count of the number of transfers required (transfer count) to four times the difference between the number of data elements to be retrieved and the number of data elements in the get FIFO 11. The number is multiplied by four because the transmission of each 32-bit data element requires four transfers on the 8-bit ready bus. For instruction 32a and the FIFO of FIG. 2B, the number transfer count is twelve, i.e. 4*(6–3). The processor 1 checks 104 whether the transfer count is greater than zero. If it is not then the transfer of data is complete 105. Otherwise if it is, the processor 1 drives 106 the Ready Control Bus 14 with a signal (GET signal) that represents a command to get data.

Upon receiving 107 the GET signal, the slave processor 2 determines 108 the number of data elements in its send FIFO 10. The number of data elements in the send FIFO of FIG. 2C is 3. If the number of entries is greater than zero, processor 2 drives 110 the Ready Bus 13 with a signal representing the first entry in its send FIFO and removes the entry from the send FIFO. For the send FIFO of FIG. 2C, the first entry is datum 31a. Otherwise if the number of entries is zero, processor 2 drives 111 the Ready Bus 13 with a predetermined signal, such as a signal representing zero, that signifies an empty send FIFO.

Processor 1 gets 112 a signal representing data from the Ready Bus 13 and decrements the transfer count, to reflect the receipt of a datum. Processor 1 checks 113 whether the received datum is zero, which signifies an empty send FIFO.

If the received datum is zero, processor 1 sets 104 the transfer count to zero to terminate the transfer of data and proceeds to 104. In instances where each data element is transmitted in multiple transfers because the bus is narrower than the data element (as shown in FIG. 1), it is possible that only part of the required transfers associated with a data element may be completed. For example, in the system of FIGS. 1–2c, the number of transfers may not be a multiple of four, signifying that an incomplete data element has been received. Should that happen, the received data corresponding to the incomplete datum is discarded so that the received data that is processed is a multiple of four.

Otherwise if the received datum is not zero, the processor stores 115 the received datum in the get FIFO 11 of processor 1 and proceeds to 104. This process is repeated until the number of data elements in the receive FIFO 11 is equal to the argument of the GET command.

Figure 4A:
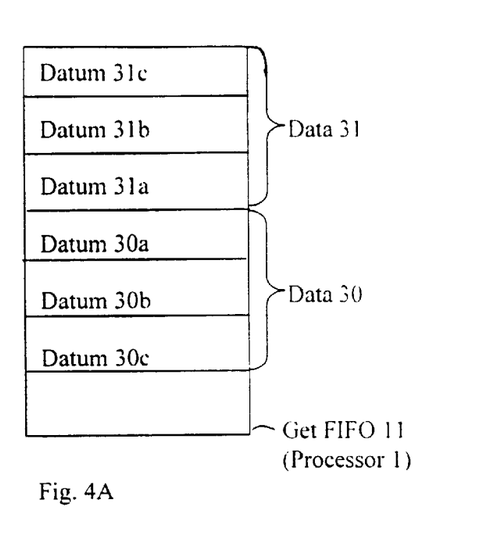
FIG. 4A shows the get FIFO of FIG. 2B after the execution of the GET instruction of FIG. 3.
Figure 4B:
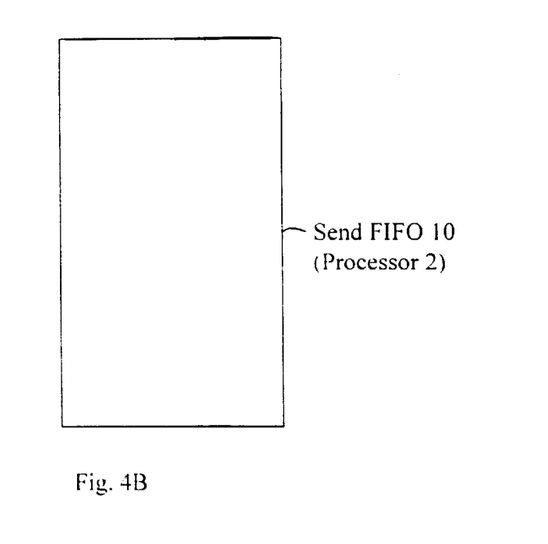
FIG. 4B shows the send FIFO of FIG. 2C after the execution of the GET instruction of FIG. 3.

Referring to FIGS. 4A and 4B, the effects of the process of FIG. 3 on the get FIFO 11 and the send FIFO 10 of FIGS. 2B and 2C will be described. The process has transferred data 31 from send FIFO 10 to get FIFO 11. Get FIFO 11 now has six data elements, as specified in the GET instruction 32a (FIG. 2A). Thus, the GET instruction provides a way to communicate data from a slave processor to a master processor using bus signals that are also used to control communication between peripherals.

Figure 5A:
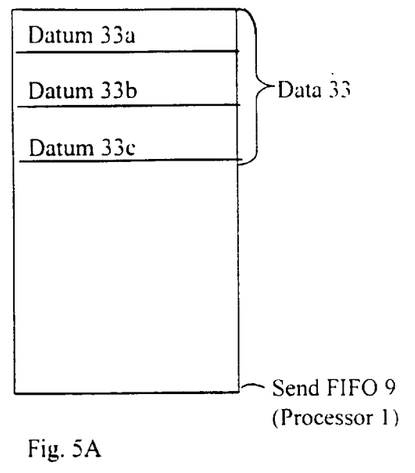
FIG. 5A shows a send FIFO of the first processor of FIG. 1 prior to the PUT instruction of FIG. 2A.
Figure 5B:
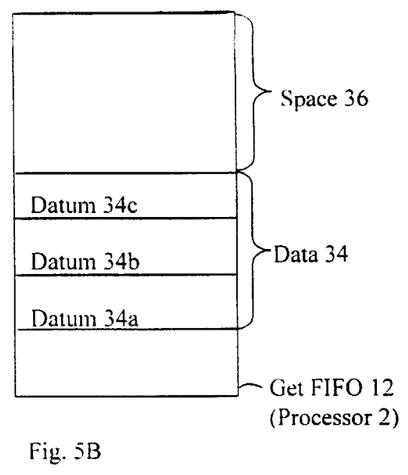
FIG. 5B shows a get FIFO of the second processor of FIG. 1 prior to the PUT instruction of FIG. 2A.

Referring to FIGS. 5A and 5B, the state of the send FIFO 9 of processor 1 and the get FIFO 12 of processor 2 prior to the PUT instruction 32b (FIG. 2A) will be described. The send FIFO 9 has three data elements 33a–c. The get FIFO 12 has three data elements 34a–c. The get FIFO 12 also has space 36 for accommodating additional data. The PUT instruction 32b transfers data from the send FIFO 9 to the get FIFO 12 as described below.

Figure 6:
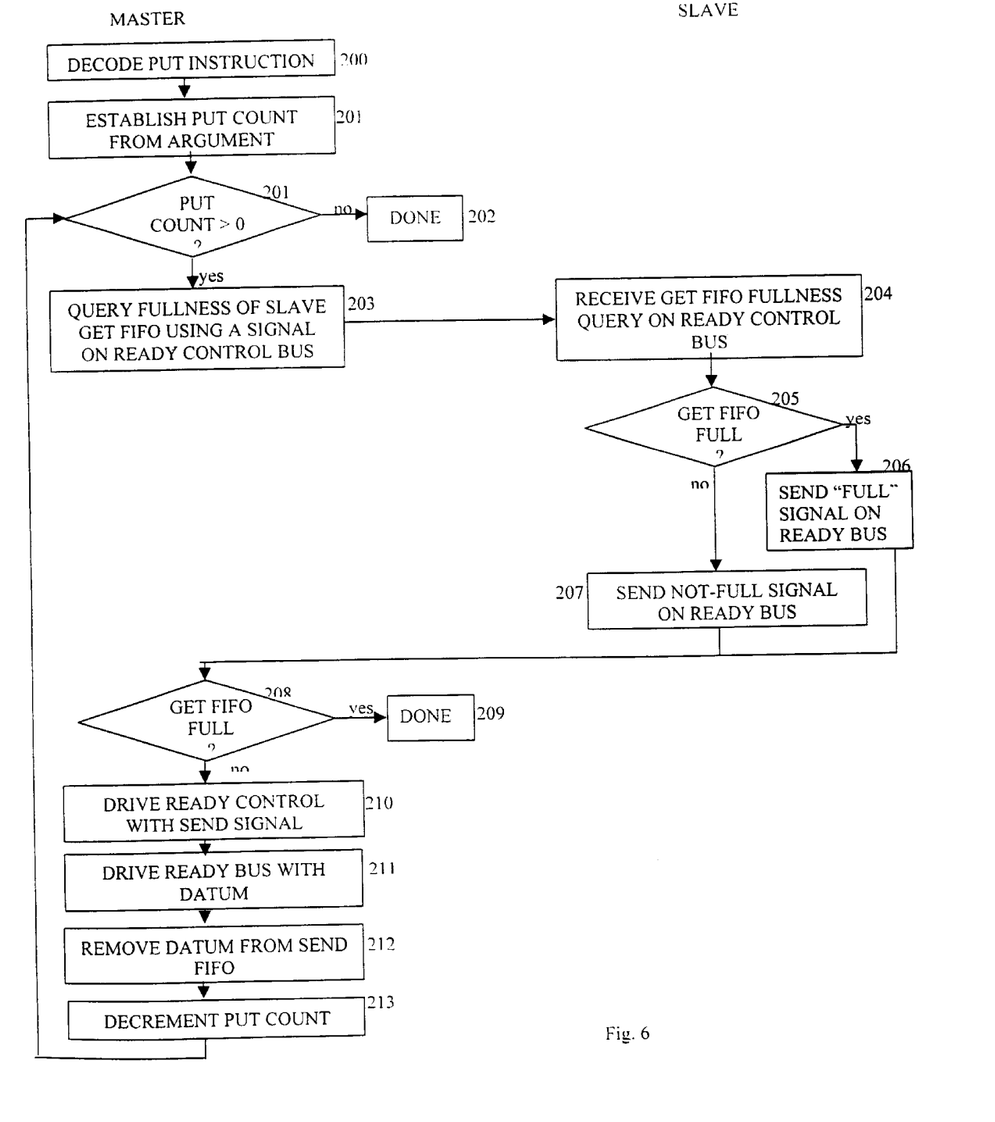
FIG. 6 is a flow chart of the execution of the PUT instruction of FIG. 2A.

Referring to FIG. 6, upon decoding 200 a PUT instruction, the master processor 1 establishes 201 the number of items (put count) to be sent to the slave processor based on the argument of the PUT instruction. Where each data element is transmitted in multiple transfers, the put count is computed by multiplying the argument with the number of transfers required to transmit a data element. For the PUT instruction 32b (FIG. 2A), the put count is 12, i.e. 3*4. The processor 2 checks 201 whether the put count is greater than zero. If the put count is not greater than zero, the process is done 202 because there are no more data elements to send. Otherwise if the put count is greater than zero, processor 1 sends 203 a signal to processor 2 over the Ready Control Bus 14 querying processor 2 to determine whether the get FIFO 12 of processor 2 is full.

Upon receiving 204 the query from processor 1, processor 2 checks 205 whether its get FIFO 12 is full. If the get FIFO 12 is full, processor 2 sends a FULL signal over the Ready Bus 13 to indicate to processor 1 that it is not ready to receive any additional data. Otherwise, processor 2 sends a NOTFULL signal over the Ready Bus to processor 1 to indicate that the get FIFO 12 is not full.

Upon receiving a signal from processor 2, processor 1 checks the signal to determine whether the get FIFO 12 of processor 2 is full. If the get FIFO 12 is full, the process is done 209 and the process terminates. Otherwise if the get FIFO 12 is not full, processor 1 drives 210 the Ready Control Bus 14 with a SEND signal to alert processor 2 that processor 1 is about to send data to processor 2. Processor 1 drives 212 the Ready Bus 13 with a datum that processor 2 stores in its get FIFO 12. Processor 1 removes 212 the sent datum from the send FIFO 9 and decrements 213 the put count, to reflect the sending of the datum. Processor 1 proceeds to 201 and repeats the process until the number of data elements sent is equal to the argument of the put instruction.

Figure 7A:
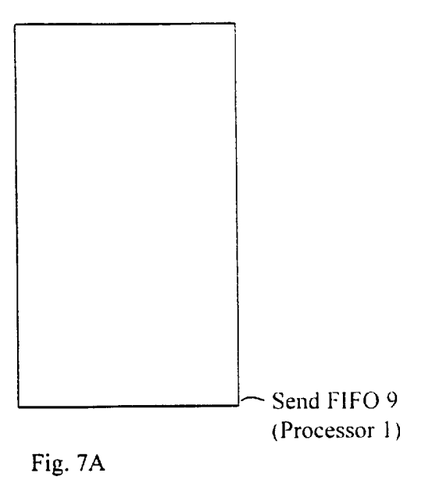
FIG. 7A shows the send FIFO of FIG. 5A after the execution of the put instruction of FIG. 6.
Figure 7B:
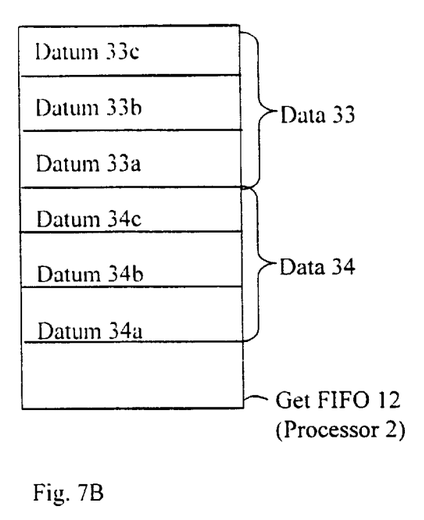
FIG. 7B shows the get FIFO of FIG. 5B after the execution of the put instruction of FIG. 6.

Referring to FIGS. 7A and 7B, the state of the send FIFO 9 (FIG. 5A) of processor 1 and the get FIFO 12 (FIG. 5B) of processor 2 after the process of FIG. 6 will be described. As shown, three data elements 33a–c have been transferred from the send FIFO 9 of processor 1 to the get FIFO 12 of processor 2 in response to the instruction 32b (FIG. 2A). Thus, the put instruction provides a method of transferring data from one processor to another processor using bus signals that are also used to control communication between peripheral devices.

Other embodiments are, within the scope of the following claims. For example, alternative implementations may control data flow using the Ready Control Bus 14 signals, instead of using a separate Ready Bus 13. In these embodiments, the data communicated between the FIFOs would be sent over the Ready Control Bus, instead of the Ready Bus.

The communication method could also be used between process that share the same SRAM or SDRAM memory, instead of the separate memories shown in FIG. 1. A different kind of memory buffer could be used instead of the send or receive FIFO. For example, a LIFO may be used for the communications on the Ready Bus.

Commonly known methods may be used to transfer control from processor 1 to processor 2 so that either processor 1 or 2 can become the master as needed.

What is claimed is:

1. A method of communicating between a first processor and a second processor comprising:
   sending a datum from the first processor over a common control bus;
   receiving the datum at the second processor from the common control bus; and
   sending a control signal from the first processor over the common control bus to alert the second processor that the first processor is about to send data prior to the sending of the datum.

2. The method of claim 1 further comprising, prior to the sending the datum:
   sending a query from the first processor to the second processor over the control bus to inquire whether the second processor is ready to receive data;
   sending a response from the second processor to the first processor indicating whether or not the second processor is ready to receive data.

3. The method of claim 1 wherein the sending is a response to a PUT instruction executed by the first processor.

4. The method of claim 3 wherein the PUT instruction directs the first processor to send multiple data, the method further comprising:
   successively sending each of the multiple data over the common control bus.

5. The method of claim 1 wherein the datum is stored in a FIFO, prior to said sending.

6. The method of claim 1 wherein the datum is stored in a FIFO subsequent to said receiving.

7. The method of claim 1 wherein the control signal is sent on a first segment of the control bus while the datum is sent on a second segment of the control bus.

8. The method of claim 2 wherein the query is sent on a first segment of the control bus while the datum is sent on a second segment of the control bus.

9. The method of claim 1 further comprising, prior to the sending of the datum from the first processor:
   sending a request for data from the second processor to the first processor on the common control bus.

10. The method of claim 9 wherein said request is sent in response to a GET instruction.

11. The method of claim 10 wherein the GET instruction directs the first processor to request multiple data, the method further comprising:
    successively requesting each of the multiple data.

12. The method of claim 9 wherein the request for data is sent on a first segment of the control bus while the datum is sent on a second segment of the common control bus.

13. The method of claim 11 wherein the data is stored in a FIFO subsequent to said receiving.

14. The method of claim 13 wherein the FIFO contains data prior to said receiving, the method being configured to successively request data until the sum of the number of prior data and the successively requested data is equal to the number directed by the GET instruction.

15. The method of claim 1 wherein the control bus is used by at least one of the first processor and the second processor to control communications with at least one peripheral device.

16. A system for communicating between processors comprising:
    a first processor and a second processor;
    a first bus for communicating between the first and second processors and peripheral devices; and
    a control bus for controlling communications on the first bus, the control bus being further configured for communicating data between the first processor and the second processor.

17. The system of claim 16 wherein the first processor has:
    a send FIFO for buffering data that is to be sent to the second processor on the common control bus; and
    a get FIFO for buffering data received on the common control bus.

18. The system of claim 16 wherein the first processor has:
    a controller for controlling communications between the peripheral devices and the processors, the bus controller being configured to control communications between the first and the second processors.

19. The system of claim 18 wherein the controller is configured to request data from the second processor in response to a GET instruction.

20. The system of claim 18 wherein the controller is configured to send data to the second processor in response to a PUT instruction.

21. The system of claim 19 or 20 wherein the instruction is part of at least one of a program, microcode, and nanocode.

22. The system of claim 18 wherein the controller includes at least one of a processing unit, a sequencer, or logic.

23. The system of claim 19 wherein the controller is configured to request the data on a first segment of the control bus and to receive the data on a second segment of the control bus.

24. The system of claim 20 wherein the controller is configured query the second processor to determine whether it is ready to receive data prior to sending the datum.

25. The system of claim 24 wherein the query is sent on a first segment of the control bus, while the data is sent on a second segment of the control bus.

26. The system of claim 19 wherein the GET instruction directs the controller to get multiple data to the second processor, the controller being configured to sequentially get each of the multiple data.

27. The system of claim 20 wherein the PUT instruction directs the controller to send multiple data to the second processor, the controller being configured to sequentially send each of the multiple data.

28. A computer processor comprising:
    a first bus interface for communicating with peripherals;
    a control bus interface for controlling communications over the first bus interface;
    a controller for controlling communications over the first bus interface using the second bus interface, the controller being further configured to communicate with a second processor over the control bus interface.

29. The system of claim 28 wherein the controller is configured to request data from the second processor using the control bus interface in response to a GET instruction.

30. The system of claim 28 wherein the controller is configured to send data to the second processor using the control bus interface in response to a PUT instruction.

31. The system of claim 29 or 30 wherein the instruction is part of at least one of a program, microcode, and nanocode.

32. The system of claim 28 wherein the controller includes at least one of a processing unit, a sequencer, or logic.

33. The system of claim 29 wherein the controller is configured to request the data on a first segment of the control bus interface and to receive the data on a second segment of the control bus interface.

34. The system of claim 30 wherein the controller is configured query the second processor to determine whether it is ready to receive data prior to sending the datum.

35. The system of claim 34 wherein the query is sent on a first segment of the control bus interface, while the data is sent on a second segment of the control bus interface.

36. The system of claim 29 wherein the GET instruction directs the controller to get multiple data to the second processor, the controller being configured to sequentially get each of the multiple data.

37. The system of claim 30 wherein the PUT instruction directs the controller to send multiple data to the second processor, the controller being configured to sequentially send each of the multiple data.

38. An article comprising a computer-readable medium which stores computer-executable instructions for communicating data from a first processor to second processor, the instructions causing:

the first processor to send a datum over a common control bus to the second processor; and     the second processor to receive the datum from the common control bus, wherein the instructions are configured to communicate the datum over the common control bus for controlling communications between at least one of the processors and at least one peripheral device.

\* \* \* \* \*